Figure 1:
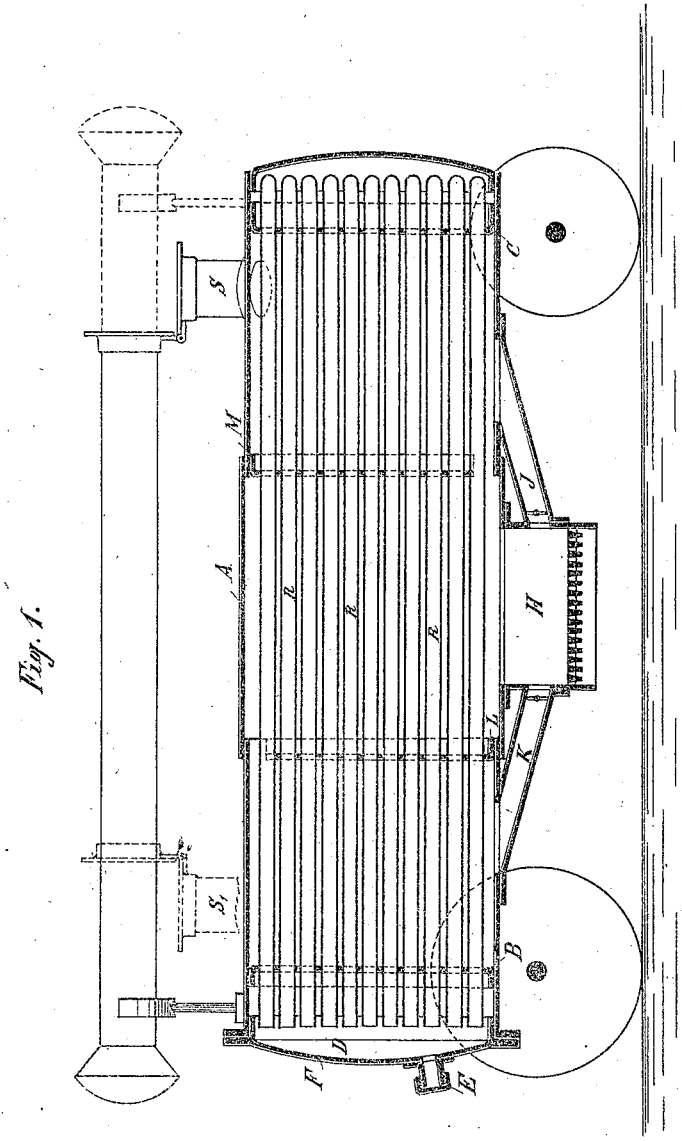

(No Model.) 2 Sheets—Sheet 1.

W. MAJERT & G. RICHTER.
PROCESS OF MAKING HYDROGEN.

No. 380,726. Patented Apr. 10, 1888.

Witnesses:

Inventors:
Wilhelm Majert & Gustav Richter
By C. S. Whitman
Attorney.

(No Model.) 2 Sheets—Sheet 2.
W. MAJERT & G. RICHTER.
PROCESS OF MAKING HYDROGEN.

No. 380,726. Patented Apr. 10, 1888.

Witnesses:
Inventors:
Wilhelm Majert and Gustav Richter.
By C. S. Whitman
Attorney.

UNITED STATES PATENT OFFICE.

WILHELM MAJERT, OF GRUNAU, NEAR BERLIN, AND GUSTAV RICHTER, OF FALKENBERG, NEAR GRUNAU, PRUSSIA, GERMANY.

PROCESS OF MAKING HYDROGEN.

SPECIFICATION forming part of Letters Patent No. 380,726, dated April 10, 1888.

Application filed April 12, 1887. Serial No. 234,502. (No model.)

*To all whom it may concern:*

Be it known that we, WILHELM MAJERT, doctor of philosophy, residing at Grunau, near Berlin, Prussia, and GUSTAV RICHTER, premier lieutenant, residing at Falkenberg, near Grunau, Prussia, Germany, both subjects of the Emperor of Germany, have invented an improved process for producing hydrogen gas in the dry way for military purposes, and apparatus therefor, of which the following is a specification.

This invention has for its object to facilitate the production of hydrogen in the field, chiefly for military purposes, and is based upon the property which zinc-dust possesses when heated in the presence of certain water-containing bodies of decomposing the latter, so as to form oxide of zinc and hydrogen gas. To this end cartridges are constructed containing zinc-dust and substances holding the component parts of water in a chemical combination, so that when the cartridges are subjected to heat in a suitable apparatus the oxygen of the water will combine with the zinc and form oxide of zinc, and the hydrogen will be liberated and received and retained in a suitable receptacle.

In filling the cartridge-cases hydrated lime may be used for mixing with the zinc-dust. This, however, when made by simply slaking quicklime, contains water in mechanical combination, which enters into reaction with the zinc-dust too soon and before the mixture is placed in the proper heating apparatus, and must therefore be got rid of. By subjecting the hydrated lime before its admixture with the zinc-dust to a heat of about 300° centigrade the water in mechanical union therewith will be driven off, and the water in chemical combination will alone remain. The hydrated lime can then be mixed with the zinc-dust and heated up to 100° centigrade for a considerable time without the hydrogen being given off, a very considerable heat (nearly red heat) being required to effect this liberation.

Instead of using hydrated lime prepared as above described with the zinc-dust for the production of hydrogen, the zinc-dust may be combined with dried hydrate of magnesia or doubly-hydrated chloride of calcium, or with the double combination of chloride of calcium with chloride of magnesium, chloride of sodium, (or chloride of potassium,) as well as with water-containing oxychloride of calcium, or the hydrate of soda or potassium, or the double oxides of sodium and calcium, or of potassium and calcium (natriumcalcium-oxyd or kaliumcalcium-oxyd.)

The cartridge-cases for containing the mixture of the zinc-dust with the water-yielding material are of sheet-iron, and about from ten to thirty centimeters in diameter by from forty to one hundred centimeters in length, and after filling are securely soldered and so rendered easily transportable.

Figure 3:
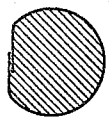
Figure 4:
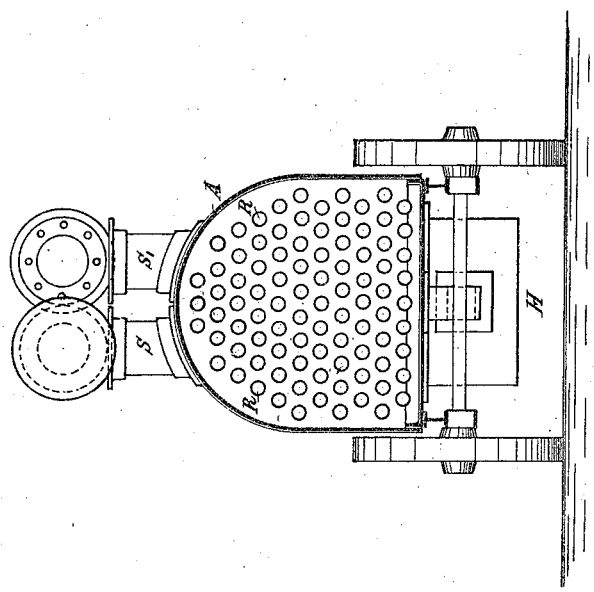

The apparatus for the production of hydrogen from these cartridges or cases is represented in Figures 1 and 2 of the accompanying drawings, which are longitudinal and cross-sections, respectively, of the apparatus used. Fig. 3 is a section of a cartridge.

In the retort A are arranged a number of tubes, R R, which are fitted into the end plates or walls, B and C. The tubes R are open on both ends, or they are closed at one end, and their open ends project into the space D, which is closed by a cap or cover, F. The latter is provided with a tubular projection, E. In the plate or wall B the tubes R are closely fitted, so that the space D is quite shut off from the other part of the retort. The furnace for the retort is situated at H, and by means of the intermediate walls or partitions, L and M, and also by means of the channels K and J, (furnished with throttle-valves,) and, finally, by means of the chimneys S and S', it is rendered possible to cause the gases of combustion to circulate throughout the retort so as to heat the tubes R on all sides.

In using the apparatus above described the tubes R, after the cover F has been opened, are filled with the "cartridges" containing the gas-yielding mixture, and the cover F is then closed. Heat being now applied by means of the furnace-fire, the soldering of the cartridges melts, and the hydrogen can therefore escape, and it will now collect in the space D and can be led thence through the tubular projection E to the place where it is required to be used.

In order that, on the charging of the tubes R with the cartridges, the liberated hydrogen may better escape into the space D, the cartridges have a flattened contour, as represented at Fig. 3 in cross-section.

The entire apparatus is mounted on wheels, and can be easily transported to the place where it is required for use.

Having now particularly described and ascertained the nature of our said invention and in what manner the same is to be performed, we declare that what we claim is—

The process of producing hydrogen gas by the heating of a mixture of zinc-dust and a substance containing water in chemical combination, substantially as and for the purpose described.

In testimony whereof we have signed our names to this specification in the presence of two subscribing witnesses.

WILHELM MAJERT.
GUSTAV RICHTER.

Witnesses:
O. WICHMANN,
B. ROI.